United States Patent [19]

Anderson et al.

[11] Patent Number: 4,727,473
[45] Date of Patent: Feb. 23, 1988

[54] SELF-LEARNING MECHANISM FOR A SET OF NESTED COMPUTER GRAPHICS

[75] Inventors: William Anderson, Ardsley; J. Allan Kiel, Hatboro; Walter Kirszbraun, Harleysville, all of Pa.

[73] Assignee: Fischer & Porter Company, Warminster, Pa.

[21] Appl. No.: 815,719

[22] Filed: Jan. 2, 1986

[51] Int. Cl.⁴ .............................................. G06F 15/00
[52] U.S. Cl. .................................. 364/188; 364/191
[58] Field of Search ............... 364/188, 189, 191, 192, 364/193, 167-171, 200, 900; 340/701, 702, 703, 704, 706, 707, 709, 710-712, 720-722

[56] References Cited

U.S. PATENT DOCUMENTS

| | | | |
|---|---|---|---|
| 3,757,037 | 9/1973 | Bialek | 364/900 |
| 4,303,973 | 12/1981 | Williamson, Jr. et al. | 364/189 |
| 4,396,977 | 8/1983 | Slater et al. | 364/188 |
| 4,413,314 | 11/1983 | Slater et al. | 340/722 |
| 4,513,366 | 4/1985 | Munekata et al. | 364/192 |
| 4,521,860 | 6/1985 | Kanematsu et al. | 364/191 |
| 4,570,217 | 2/1986 | Allen et al. | 364/188 |

Primary Examiner—Jerry Smith
Assistant Examiner—Allen MacDonald
Attorney, Agent, or Firm—Michael Ebert

[57] ABSTRACT

A set of nested graphics for a computer-controlled industrial plant or any other complex system having several interrelated sections. The nested set includes a graphic having entry points thereon each providing access to respective other graphics in the set. These have entry points thereon which provide access to still other graphics so that paths can be established interconnecting the various graphics in the set. The operating mechanism is such that when a cursor is positioned on a given entry point in one graphic being displayed and a SELECT button is pressed, access is then had to a second graphic corresponding to the selected point; and when a NEXT key is operated, this second graphic is displayed. When the cursor is then positioned on an entry point in the displayed second graphic and the SELECT button is pressed, access is had to a third graphic corresponding to the selected entry point, which third graphic is displayed when the NEXT key is operated. By such entry point selection, the operator establishes a path extending from the one graphic through the selected second graphic to the selected third graphic. This path is learned by the operating mechanism so that one may now move back on this path by operating a BACK key or forward therein by operating the NEXT key without the need to select entry points.

5 Claims, 5 Drawing Figures

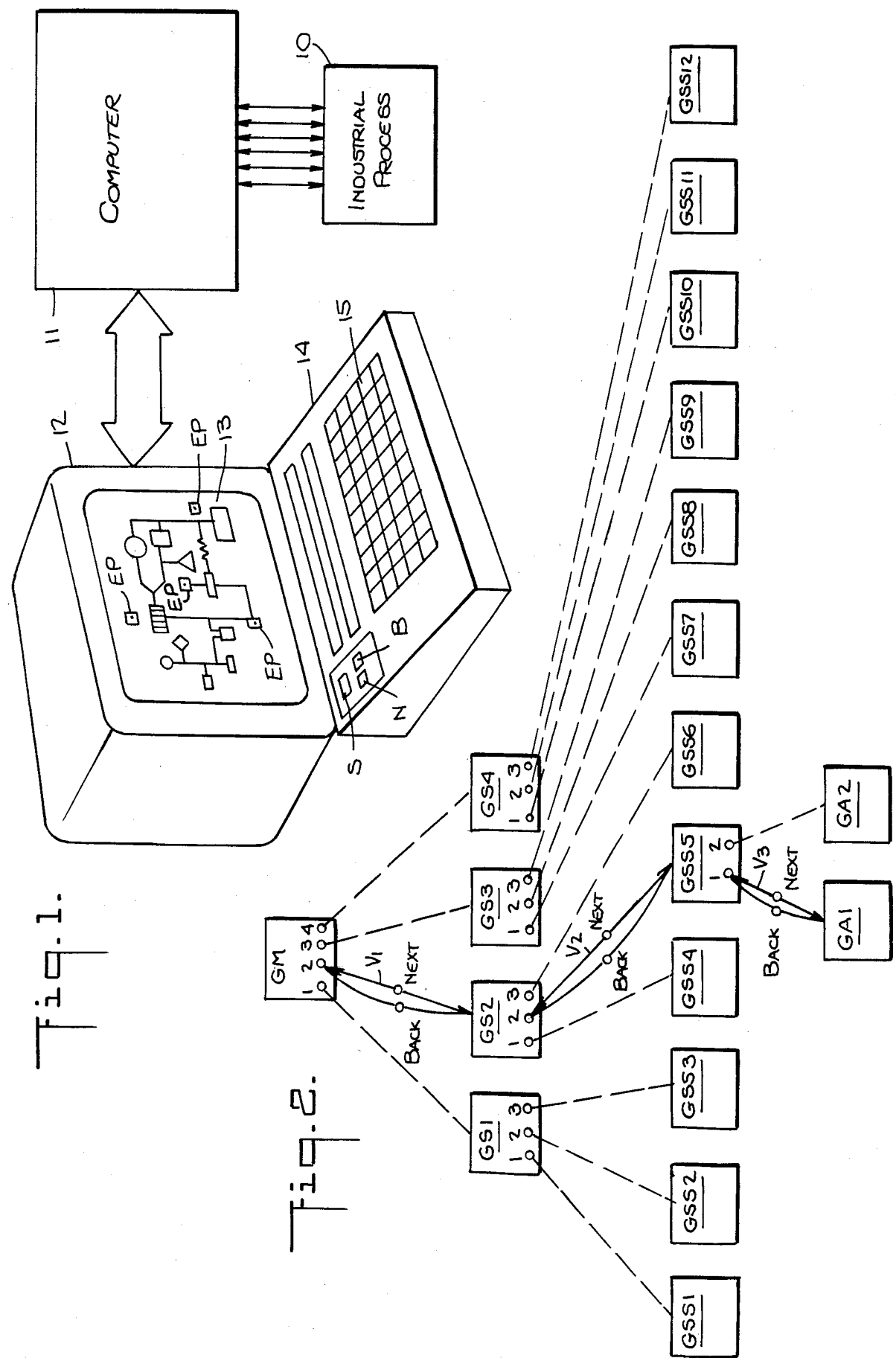

SELF-LEARNING MECHANISM FOR A SET OF NESTED COMPUTER GRAPHICS

BACKGROUND OF INVENTION

1. Field of Invention

This invention relates generally to computer graphics, and more particularly to a self-learning mechanism to establish a path through a set of nested graphics to facilitate the selection of a graphic display.

2. Status of Prior Art

Involved in computer graphics is communication between an operator and a computer wherein the input and output of the computer takes the form of charts, drawings or pictorial representations. Thus, a computer graphics display may be a line drawing of a two or three dimensional abstraction, the structural component of a building or a flow chart.

In an industrial process control system, the several process variables to be controlled, such as flow rate, pressure and temperature are sensed by individual transducers each included in a local process loop. In direct digital control, the several local control loops of a given installation are governed by a computer having a CRT display terminal on which one may graphically display the process being controlled and alphanumeric data relating thereto.

Thus, in a chemical processing plant in which, say, a process is carried out in a reactor into which is fed through respective control valves various chemicals and catalysts as well as steam under pressure derived from a steam generator, among the process variables are the flow rates of the inflowing chemicals into the reactor, the timing of the reaction, the level of temperature within the reactor, the flow rate of the product discharged from the reactor as well as the steam pressure. In a computer-controlled system, a schematic diagram or flow chart of the reactor process is graphically presented on the cathode ray tube tube (CRT) terminal before which is an operator console, making it possible for the operator to single out any process variable on the display and to exercise control thereover.

In order for an operator to select any process variable in a computer graphics display, the use of a cursor is conventional. A cursor is a symbol or special character serving as a pointer to allow interaction between the console operator and the program. It may take the form of a blinking luminous dot, an inverted V or caret, or any other distinctive symbol.

On a vector graphics console, the cursor symbol is usually manipulated by a manual input device such as a joystick, a data tablet, a trackball, a forcestick or a mouse. In the case of a joystick, for example, the operator can, as it were, drive the cursor around the screen to a point where it coincides with the exact X-Y location of the desired control point on the graphics display. It is also possible to manipulate cursor coordinates with a key matrix.

The concern of the present invention is with a set of nested graphics of the type appropriate to relatively elaborate industrial chemical plants, or any other installation in which the operating system is controlled from a central computer. When the system is highly complex and is composed of many interrelated sections or stages each having a multitude of process variables, it is not possible to encompass the entire system on a single graphics display in sufficient detail to include all action or control points in the system capable of being selected by a cursor.

To provide an adequate set of nested graphics for this purpose, the set may be in hierarchical form and include a primary graphic containing a general diagram of the entire system, secondary graphics each showing a respective section of the system in greater detail, and tertiary graphics each showing a respective sub-section of a given section. For a highly complex, system, it may be necessary to further sub-divide the tertiary graphics to provide additional graphics affording even more detailed showings. Or the set may be in non-hierarchical form and made up of various graphics each showing a section or sub-section of the system being controlled. The invention is not limited to any one form of nested graphics and encompasses any set whose graphics provide information in regard to a system or parts thereof that is computer controlled.

One commonly used method of CRT display selection at a computer terminal requires the operator to enter a character string at the keyboard to identify the desired display, this being followed by an ENTER or SELECT function. Another known method by which one can effect display selection is by positioning a cursor on the CRT screen. Also in use are paging techniques allowing movement through a pre-configured display.

When a problem arises in the computer-controlled installation and the operator finds it necessary to move back and forward through a nested set of graphics in search of a graphic in which the problem is located, all conventional methods capable of such movement are relatively slow. The reason for this is that the operator must repeat selections or be forced to view intermediate or undesired displays in the course of searching for the desired display.

SUMMARY OF INVENTION

In view of the foregoing, the main object of this invention is to provide a computer graphics terminal having a self-learning operating mechanism for establishing a path through a set of nested graphics.

More particularly, an object of this invention is to provide a set of nested graphics in which entry points are displayed on the screen of a CRT terminal as an integral part of a graphic representing the computer-controlled system or a section thereof, whereby an entry point may be selected by a movable cursor.

A significant feature of the invention is that the cursor selection of an entry point on one graphic establishes a vector path to another graphic in the set; and that as one jumps in this manner from one graphic to another, the operating mechanism effectively learns the menu selections made by the operator and then allows him to move back and forward on the established path without re-selection of the entry points, thereby expediting the selection process.

Also an object of this invention is to provide an operating mechanism of the above type which is relatively easy to operate and which functions efficiently and reliably.

Briefly stated, these objects are attained in a set of nested graphics for a computer-controlled industrial plant or any other complex system having several interrelated sections. The nested set includes a graphic having entry points therein providing access to respective other graphics in the set and having entry points thereon which provide acces to still other graphics so that paths can be established interconnecting the various graphics in the set.

The operating mechanism is such that when a cursor is positioned on a given entry point in one graphic and a SELECT button is pressed, access is then had to a second graphic corresponding to the selected point; and when a NEXT key is operated, this second graphic is displayed. When the cursor is then positioned on an entry point in the displayed second graphic and the SELECT button is pressed, access is had to a third graphic corresponding to the selected entry point, which third graphic is displayed when the NEXT key is operated.

By such entry point selection, the operator establishes a path extending from the one graphic through the selected second graphic to the selected third graphic. This path is learned by the operating mechanism so that one may now move back on this path by operating a BACK key or forward therein by operating the NEXT key without the need to select entry points.

OUTLINE OF DRAWINGS

For a better understanding of the invention as well as other objects and further features thereof, reference is made to the following detailed description to be read in conjunction with the accompanying drawings, wherein:

FIG. 1 shows a computer graphics terminal in accordance with the invention;

FIG. 2 schematically illustrates a set of nested graphics in accordance with the invention;

DESCRIPTION OF INVENTION

The Basic System

Figure 3:
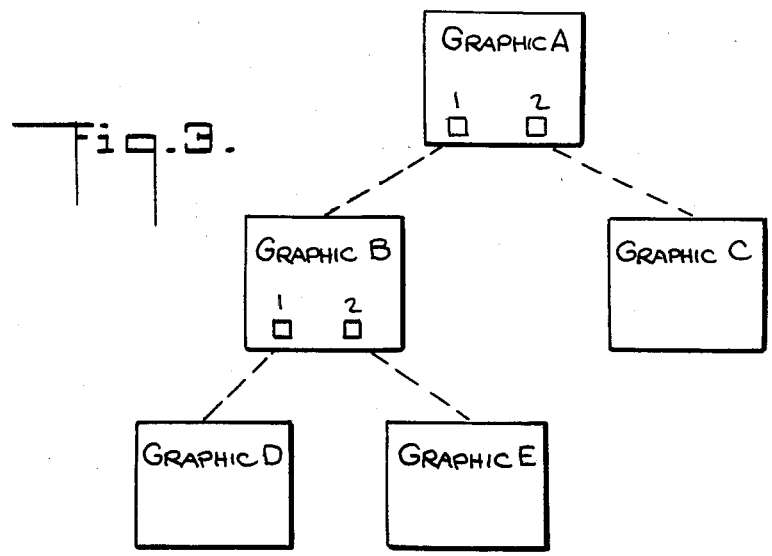
FIG. 3 is a simplified set of nested graphics to illustrate how the operating mechanism works.

Referring now to FIG. 1, where is schematically illustrated an arrangement in accordance with the invention for controlling an industrial process installation represented by block 10, by means of a computer 11 which is associated with a cathode-ray tube terminal 12. The terminal is provided with a display screen 13 on which is graphically presented the various stages and stations of the process being controlled by means of a set of nested graphics.

The operator who views the screen is provided with a console 14 having an alphanumeric keyboard 15. Also on the console is a SELECT button S, a NEXT key N and a BACK key B whose functions will be later explained. The terminal is also provided with a cursor which can be manipulated by the operator at the console to occupy any desired position on the screen to select an entry point on the display graphic in a manner to be later described. The means used for manipulating the cursor may be of any known type and form no part of the present invention. These entry points EP are dispersed on the screen.

Because of the complexity of the installation and the many controllable elements therein, it is not possible in a single graphic to display the entire system and all of the controllable elements therein subject to control. It is for this reason that the graphics for this installation takes the form of a set of nested graphics which, as explained previously, may be in any form appropriate to the system under control.

An example of such a set which is in hierarchical form is shown in FIG. 2, in which GM is the main or primary graphic to provide a general operating diagram of the entire installation. The installation is composed of interrelated stages or sections; and in order to show these diagrammatically in greater detail, secondary graphics are provided which in this example are constituted by graphics GS1, GS2, GS3 and GS4, each showing a respective section of the entire system. In practice, a greater or smaller number of secondary graphics may be provided.

In order to show each of the secondary graphics in an expanded form and in still greater detail, tertiary graphics are provided. Thus, the section covered by secondary graphic GS1 is divided into tertiary graphics GSS1, GSS2 and GSS3, each showing a sub-section of the related section in an expanded view. In a like manner, tertiary graphics GSS4, GSS5 and GSS6 are sub-sections of the section covered by secondary graphic GS2; tertiary graphics GSS7, GSS8 and GSS9 are sub-sections of the section covered by secondary graphic GS3; and tertiary graphics GSS10, GSS11 and GSS12 are sub-sections of the section covered by secondary graphic GS4.

In some instances, it may be necessary to sub-divide a sub-section to provide an expanded and even more detailed view thereof. Hence, in FIG. 2, the tertiary graphic GSS5 is divided into additional graphics GA1 and GA2. It is to be understood that the set of nested graphics shown in FIG. 2 is merely by way of illustration, and that in actual practice, the breakdown of the system into a set of nested graphics will be in a format appropriate to the system.

The operating mechanism for selecting from the set a graphic of interest makes use of entry points which are an integral part of a graphic and are displayed on the CRT screen when the graphic containing the entry points is presented thereon. While in FIG. 2 the entry points are shown in a row, in practice these points are dispersed on the graphic.

Thus, graphic GM is provided with entry points 1 to 4, each identifying a respective section of the system which in this example has four sections whose diagrams are displayed by secondary graphics GS1 to GS4. If there had been five sections, there would then have been five entry points.

Each secondary graphic for a section of the system, since it is associated with three sub-section tertiary graphics, is provided with three entry points 1 to 3. And in the case of tertiary graphic GSS4, since it is associated with two additional graphics, this graphic is provided with only two entry points 1 and 2.

The Operating Mechanism

We shall now assume that the operator at the console of the terminal is viewing a diagram of the entire installation, this being presented on the CRT screen by primary graphic GM. And now the operator wishes to view the section of this installation which is diagrammed by secondary graphic GS2.

In order to see graphic GS2, the operator first positions the cursor on the screen so that it coincides with entry point 2, and he then presses the SELECT button to access this graphic by way of the pre-configured vector path $V_1$ shown in solid line in FIG. 2. By then operating the NEXT key, secondary graphic GS2 is presented on the screen to provide an expanded and more detailed view of a section of the total system.

On secondary graphic GS2 are entry points 1 to 3; and if the operator now wishes to see, say, tertiary graphic GSS5 showing in greater detail a particular sub-section of the section covered by secondary graphic GS2, he then positions the cursor to coincide with entry point 2 in graphic GS2 to access the pre-configured vector path $V_2$ leading to the selected tertiary graphic. By then operating the NEXT key, tertiary graphic GSS5 is presented on the CRT screen.

If now the operator wishes to select the additional graphic GA1 showing in greater detail an expanded part of the diagram covered by tertiary graphic GSS5, he positions the cursor on entry point 1 in this tertiary graphic and presses the SELECT button to access the pre-configured vector path $V_3$ leading to additional graphic GA1. Graphic GA1 is presented when the NEXT key is operated.

This display selection procedure which requires the positioning of the cursor on an entry point in a displayed graphic followed by operation of the SELECT button and the NEXT key establishes a multi-vector path linking those graphics in the nested set which are selected by the operator. This path is learned by the operating mechanism and held in the computer memory.

If, therefore, the operator viewing graphic GA1 wishes to return to graphic GS2, he then operates the BACK key once, which jumps the display to graphic GSS5, and he again operates the BACK key to switch the display to graphic GS2. And if he wishes to again go from graphic GS2 to GSS5, he simply operates the NEXT key, for the path thereto has been learned.

Thus, the operating mechanism, once a path has been established linking selected graphics in the nested set thereof, is able to move back and forth on this path simply by operating the NEXT and BACK keys without the need to reselect the menu entries.

If, however, the operator, when going back from graphic GA1 to GS2, wishes to make a new entry selection at GS2 to obtain access, say, to graphic GSS6, in doing so the mechanism will at the same time erase the portion of the path which is forward of the entry selection. In this instance, the forward part of the path is constituted by vectors $V_2$ and $V_3$. But vector path $V_1$ will be retained, and the operator can continue to go back and forward on $V_1$.

Should the operator decide to select a graphic from the nested set by a method extrinsic to the operating mechanism, as by using a normal character string entry procedure, then the complete path previously established by the operating mechanism will be erased automatically. And if a BACK operation is attempted for a display which was not entered by a NEXT operation, the display status will remain unchanged. Should a NEXT operation be attempted without first making a menu selection, the display status will not then change.

The operating mechanism is such that after a set of nested graphics is constructed for the system under computer control, software subroutines are executed in regard to the entry points on the menus and the vector paths established thereby among the graphics in the nested set.

Simplified Example

To give a very simple example of how graphics vectoring is carried out by the operating mechanism, FIG. 3 shows a nested set of five graphics A to E, representing five different sections of a plant. Graphics A and B each include only two entry points 1 and 2. The dashed lines interlinking graphics A to E represent pre-configured vector paths.

Figure 4:
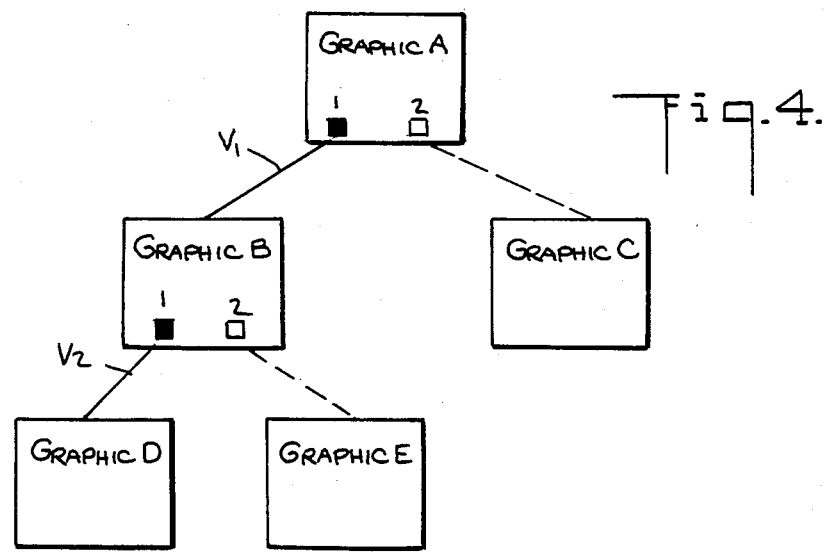
FIG. 4 illustrates the selection of one graphic in the simplified set.

If graphic A is displayed on the CRT screen and the operator now wishes to select for display graphic B, he positions the cursor on entry point 1 in graphic A, as indicated in black in FIG. 4. He then presses the SELECT button to establish vector path $V_1$ between graphics A and B, and by operating the NEXT key, graphic B will be presented.

If now the operator wishes to select graphic D for display, he positions the cursor on entry point 1 in displayed graphic B, shown in FIG. 4. He then presses the SELECT button to establish vector path $V_2$ between graphics B and D, and operates the NEXT key to cause graphic D to be displayed.

Now there is a path formed by vectors $V_1$ and $V_2$ linking graphics A, B and D, and this path can be traversed using the BACK key to move up and the NEXT key to move down the path without the need for entry point selection.

Figure 5:
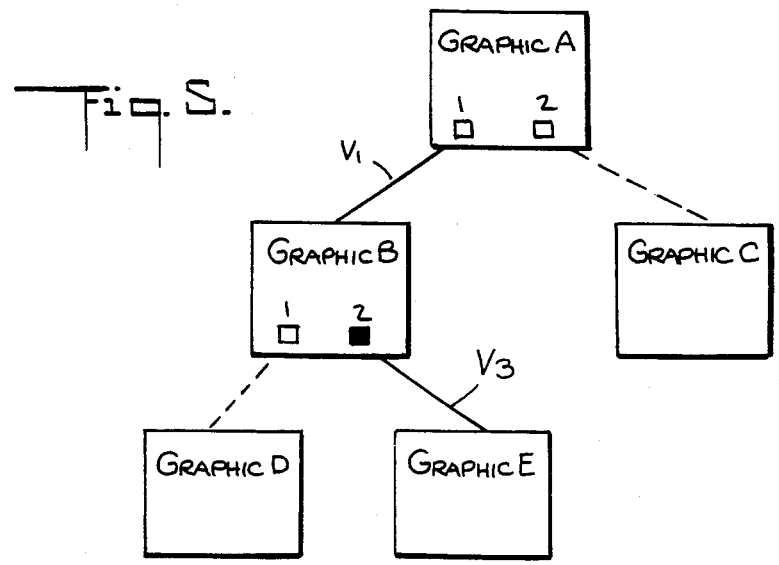
FIG. 5 illustrates the selection of another graphic in the simplified set.

Let us assume, however, that the operator made an error by going to graphic D and that he should have gone to graphic E. To correct this error, he operates the BACK key to go from graphic D back to graphic B, and there he selects entry point 2 with a cursor as shown in FIG. 5, and operates the SELECT button and the NEXT key to go to graphic E by way of vector $V_3$. Vector $V_1$ is not disturbed by this action, and the new path constituted by vectors $V_1$ and $V_3$ can be traversed using the NEXT and BACK keys.

In this way, the operating mechanism learns the operator's movements and maintains the latest sequence of vectors. The operator is thereby relieved of the need to memorize the specific sequence of graphics that he traversed to find a problem in the plant.

While there has been shown and described a preferred embodiment of a self-learning mechanism for a set of nested computer graphics in accordance with the invention, it will be appreciated that many changes and modifications may be made therein without, however, departing from the essential spirit thereof.

We claim:

1. In a computer-controlled system for an industrial plant having several parts, the computer having a memory and being provided with a graphics terminal having a display screen and means to manipulate a cursor to any desired screen position, the combination comprising:

(A) a set of nested graphics containing diagrams of different parts of the plant, some of which include entry points identifying other graphics in the set;

(B) a terminal console including Select, Next and Back keys; and (C) an operating mechanism in said terminal responsive to the keys and cooperating with the set of nested graphics, said mechanism including means for imparting thereto an automatic graphics interlinking path learning capability whereby an operator viewing a first graphic on the screen can position the cursor on any one of the entry points, and by pressing the Select key can then obtain access to a second graphic related to the selected point which is displayed on the screen when the Next key is operated, and by making an entry selection on the second graphic and repeating the selection procedure, can obtain access to and display a third graphic, thereby establishing a path interlinking the first, second and third graphics which is learned by the operating mechanism and held in the computer memory, thereby making it possible for the operator to move back on this path by operating the Back key and to move forward thereon by operating the Next key without the need for further entry point selection, the learning capability of the operating mechanism being constituted by software subroutines which after a set of nested graphics is constructed for the system are executed in regard to the entry points in the graphics and the vector paths established thereby among the graphics in the nested set.

2. The combination set forth in claim 1, wherein said set of nested graphics is constituted by a primary graphic which is a diagram of the entire plant, each section of which is shown in a plurality of secondary graphics, sub-sections of each section being shown in tertiary graphics.

3. The combination as set forth in claim 2, wherein said primary graphic contains entry points identifying the plurality of sections, and each secondary graphic showing a respective section includes entry points identifying the tertiary graphics related to said section.

4. The combination as set forth in claim 1, wherein said cursor is operated by a key matrix on the console.

5. The combination as set forth in claim 1, wherein said console includes an alphanumeric keyboard for controlling elements in the system shown on the display screen.

* * * * *